US009209866B2

(12) United States Patent
Ingels

(10) Patent No.: US 9,209,866 B2
(45) Date of Patent: Dec. 8, 2015

(54) SECURING OF A TELECOMMUNICATION DEVICE EQUIPPED WITH A NEAR-FIELD COMMUNICATION MODULE

(75) Inventor: Didier Ingels, Grand-Rosiere (BE)

(73) Assignee: PROTON WORLD INTERNATIONAL N.V., Zaventem (BE)

( * ) Notice: Subject to any disclaimer, the term of this patent is extended or adjusted under 35 U.S.C. 154(b) by 176 days.

(21) Appl. No.: 13/818,630

(22) PCT Filed: Aug. 25, 2011

(86) PCT No.: PCT/EP2011/064643
§ 371 (c)(1),
(2), (4) Date: May 6, 2013

(87) PCT Pub. No.: WO2012/028532
PCT Pub. Date: Mar. 8, 2012

(65) Prior Publication Data
US 2013/0217325 A1 Aug. 22, 2013

(30) Foreign Application Priority Data
Aug. 31, 2010 (FR) ...................... 10 56913

(51) Int. Cl.
*H04B 5/00* (2006.01)
*H04M 1/23* (2006.01)
(52) U.S. Cl.
CPC ............ *H04B 5/0037* (2013.01); *H04B 5/0031* (2013.01); *H04M 1/23* (2013.01); *H04M 2250/04* (2013.01)

(58) Field of Classification Search
CPC ..... H04B 5/0037; H04W 88/02; H04W 52/00
USPC .................... 455/41.1, 41.2, 41.3, 552.1, 572
See application file for complete search history.

(56) References Cited

U.S. PATENT DOCUMENTS

| 6,070,243 | A | 5/2000 | See et al. |
| 6,092,191 | A | 7/2000 | Shimbo et al. |
| 7,974,536 | B2 | 7/2011 | Yu et al. |

(Continued)

FOREIGN PATENT DOCUMENTS

| CN | 1596018 A | 3/2005 |
| CN | 1933351 A | 3/2007 |

(Continued)

OTHER PUBLICATIONS

International Search Report and Written Opinion of the International Searching Authority dated Jan. 17, 2012 from corresponding International Application No. PCT/EP2011/064643.

(Continued)

*Primary Examiner* — Wesley Kim
*Assistant Examiner* — Md Talukder
(74) *Attorney, Agent, or Firm* — Seed IP Law Group PLLC

(57) ABSTRACT

A telecommunication device including a battery capable of providing a first power supply voltage to circuits of the device, among which at least one security module; a near-field communication module capable of providing a second power supply voltage to the security module; and a circuit for activating the provision of the second power supply voltage, including a switch controllable at least by one element accessible from outside of the device.

16 Claims, 3 Drawing Sheets

(56) References Cited

U.S. PATENT DOCUMENTS

| | | | |
|---|---|---|---|
| 2004/0065735 A1* | 4/2004 | Christoffers et al. | 235/451 |
| 2004/0232220 A1* | 11/2004 | Beenau et al. | 235/380 |
| 2005/0013310 A1 | 1/2005 | Banker et al. | |
| 2007/0263596 A1 | 11/2007 | Charrat | |
| 2008/0085001 A1 | 4/2008 | Charrat et al. | |
| 2008/0219444 A1 | 9/2008 | Benteo et al. | |
| 2008/0296978 A1* | 12/2008 | Finkenzeller et al. | 307/104 |
| 2009/0106824 A1* | 4/2009 | Morel et al. | 726/4 |
| 2009/0206984 A1 | 8/2009 | Charrat et al. | |
| 2010/0084465 A1 | 4/2010 | Jolivet | |
| 2010/0090805 A1* | 4/2010 | Libotte | 340/10.2 |
| 2010/0137025 A1 | 6/2010 | Tal et al. | |
| 2010/0161403 A1 | 6/2010 | Fisher et al. | |
| 2010/0178867 A1 | 7/2010 | Charrat | |
| 2010/0178868 A1 | 7/2010 | Charrat | |
| 2010/0210300 A1* | 8/2010 | Rizzo et al. | 455/552.1 |
| 2010/0227553 A1 | 9/2010 | Charrat et al. | |
| 2010/0245054 A1 | 9/2010 | Kim | |
| 2010/0259216 A1* | 10/2010 | Capomaggio | 320/108 |
| 2011/0065398 A1* | 3/2011 | Liu et al. | 455/127.1 |
| 2011/0226853 A1 | 9/2011 | Soh et al. | |
| 2011/0237190 A1* | 9/2011 | Jolivet | 455/41.2 |
| 2011/0269423 A1 | 11/2011 | Schell et al. | |
| 2012/0052801 A1 | 3/2012 | Kulkarni | |
| 2012/0190299 A1 | 7/2012 | Takatsuka et al. | |
| 2012/0190332 A1 | 7/2012 | Charles | |
| 2013/0057640 A1 | 3/2013 | Callahan | |
| 2013/0059563 A1 | 3/2013 | Huque et al. | |
| 2013/0059566 A1* | 3/2013 | Huque et al. | 455/411 |
| 2013/0059567 A1 | 3/2013 | Huque et al. | |
| 2013/0059568 A1 | 3/2013 | Huque et al. | |
| 2013/0217325 A1* | 8/2013 | Ingels | 455/41.1 |
| 2013/0225125 A1 | 8/2013 | Hugue et al. | |
| 2013/0337770 A1 | 12/2013 | Huque et al. | |
| 2014/0041036 A1 | 2/2014 | Huque et al. | |
| 2014/0201815 A1 | 7/2014 | Van Nieuwenhuyze et al. | |
| 2014/0289833 A1 | 9/2014 | Briceno et al. | |

FOREIGN PATENT DOCUMENTS

| | | |
|---|---|---|
| CN | 101079013 A | 11/2007 |
| CN | 101202621 A | 6/2008 |
| CN | 101491052 A | 7/2009 |
| CN | 101536008 A | 9/2009 |
| EP | 1 909 431 A1 | 4/2008 |
| EP | 1 928 099 A1 | 6/2008 |
| EP | 2 034 705 A1 | 3/2009 |
| EP | 2 219 353 A1 | 8/2010 |
| FR | 2921786 A1 | 4/2009 |
| WO | 2007/068993 A1 | 6/2007 |
| WO | 2007/093580 A1 | 8/2007 |
| WO | 2009/115997 A2 | 9/2009 |
| WO | 2009/147094 A1 | 12/2009 |

OTHER PUBLICATIONS

International Search Report and Written Opinion of the International Searching Authority from potentially related International Application No. PCT/EP2011/064639.
Smart Card Alliance: *Security of Proximity Mobile Payments*, A Smart Card Alliance Contactless and Mobile Payments Council White Paper, Smart Card Alliance, US, No. CPMC-09001, May 1, 2009, pp. 1-39, XP007913611.
Smart Cards: UICC—*Contactless Front-end (CLF) Interface; Host controller Interface (HCI)* (Release 7); ETSI Standard, Europena Telecommunications Standards Institute (ETSI), Sophia Antipois Cedex, France, vol. SCP-T, No. V7.4.0, Apr. 1, 2009, XP)14043836.
Pasquet M. et al., "*Payment with Mobile NFC Phones*" How to analyze the security problems, the 2008 International Symposium on Collaborative Technologies and Systems (CTS 2008), pp. 1-8, hai-00256675, verson 1, Feb. 16, 2008.
ETSI TS 102 622, "Smart Cards; UICC—Contactless Front-end (CLF) Interface; Host Controller Interface (HCI) (Release 10)," V10. 2.0, Technical Specification, Mar. 2011, 56 pages.
ETSI TS 102 695-2, "Smart Cards; Test specification for the Host Controller Interface (HCI); Part 2: UICC features (Release 7)," V7.2. 0, Technical Specification, Oct. 2010, 62 pages.
Francis et al., "Potential Misuse of NFC Enabled Mobile Phones with Embedded Security Elements as Contactless Attack Platforms," The Institute of Electrical and Electronics Engineers, Inc., 2009, 8 pages.
French Search Report, dated Oct. 19, 2010, for French Application No. 1051693, 6 pages.
French Search Report, dated Oct. 21, 2010, for French Application No. 1051694, 7 pages.
French Search Report, dated Oct. 11, 2010, for French Application No. 1051695, 7 pages.
French Search Report, dated Nov. 23, 2010, for French Application No. 1051696, 7 pages.
French Search Report, dated May 4, 2011, for French Application No. 1060819, 6 pages.
International Search Report, mailed Apr. 6, 2011, for International Application No. PCT/EP2011/052899, 2 pages.
International Search Report, mailed Apr. 19, 2011, for International Application No. PCT/EP2011/052902, 2 pages.
International Search Report, mailed May 19, 2011, for International Application No. PCT/EP2011/052907, 3 pages.
International Search Report, mailed Jun. 8, 2011, for International Application No. PCT/EP2011/052930, 3 pages.
International Search Report, mailed Jun. 6, 2012, for International Application No. PCT/EP2012/055312, 2 pages.
International Search Report, mailed Mar. 23, 2012, for International Application No. PCT/FR2011/053023, 4 pages.
International Search Report, mailed Jul. 12, 2012, for International Application No. PCT/FR2012/050762, 3 pages.
Madlmayr et al., "Management of Multiple Cards in NFC-Devices," LNCS 5189, CARDIS 2008, pp. 149-161. (14 pages).
Madlmayr et al., "NFC Devices: Security and Privacy," The Third International Conference on Availability, Reliability and Security, pp. 642-647, 2008. (6 pages).
Rieback et al., "Keep on Blocking in the Free World: Personal Access Control for Low-Cost RFID Tags," LNCS 4631, Security Protocols 2005, pp. 51-59. (10 pages).
Written Opinion, mailed Mar. 9, 2010, for International Application No. PCT/EP2011/052899, 8 pages.
Written Opinion, mailed Apr. 19, 2011, for International Application No. PCT/EP2011/052902, 6 pages.
Written Opinion, mailed May 19, 2011, for International Application No. PCT/EP2011/052907, 8 pages.
Written Opinion, mailed Jun. 8, 2011, for International Application No. PCT/EP2011/052930, 8 pages.
Written Opinion, mailed Jun. 6, 2012, for International Application No. PCT/EP2012/055312, 8 pages.
Written Opinion, mailed Mar. 23, 2012, for International Application No. PCT/FR2011/053023, 6 pages.
Written Opinion, mailed Jul. 12, 2012, for International Application No. PCT/FR2012/050762, 5 pages.

\* cited by examiner

SECURING OF A TELECOMMUNICATION DEVICE EQUIPPED WITH A NEAR-FIELD COMMUNICATION MODULE

CROSS REFERENCE TO RELATED APPLICATIONS

This application is a U.S. National Stage patent application based on International patent application number PCT/EP2011/064643, filed on Aug. 25, 2011, which application claims the priority benefit of French patent application number 10/56913, filed on Aug. 31, 2010, which applications are hereby incorporated by reference to the maximum extent allowable by law which is hereby incorporated by reference to the maximum extent allowable by law.

BACKGROUND

1. Technical Field

The present disclosure generally relates to mobile telecommunication devices equipped with a near field communication circuit (NFC).

2. Discussion of the Related Art

Cell phones are more and more often equipped with a near field communication interface, which enables combining electromagnetic transponder functions with mobile telephony functions. In particular, this adds contactless card type electromagnetic transponder emulation functions to the mobile telecommunication device, of personal digital assistant, cell phone, smartphone, or other type. This enriches the features of the mobile device, which can then be used, for example, as an electronic purse, as a debit or credit system, as an access validation device, as a transport ticket, etc.

To emulate the operation of a contactless chip card, the mobile telecommunication device is equipped with a contactless front-end integrated circuit (CLF), also called an NFC router. This router is equipped with a radio frequency transceiver front head associated with a low-range antenna to communicate like an electromagnetic transponder. The router uses the capacities of the mobile device processor(s) for data processing and storage operations. For access control, electronic purse, payment, and other applications, a secure element enabling to authenticate the user is used. This secure element is either integrated to the mobile telecommunication device (dedicated integrated circuit, circuit welded to the printed circuit board) or contained in a microcircuit supported by a subscriber identification module (SIM), or any other removable card, for example in the standard format of a memory card.

A specificity of such a mobile telecommunication device is that it is capable of operating in NFC when it is off or, more generally, when its circuits are not powered by the battery or another power supply element of the mobile device.

In this case, the NFC router draws the power necessary to its operation, like an electromagnetic transponder, from the field radiated by a nearby terminal. It then provides the power supply necessary to the security module circuits to validate near-field transactions.

When the device is powered by its battery and its internal circuits are operating, different security mechanisms may be implemented, for example, to avoid a hacking of the SIM card. However, when the device is only powered via the NFC router, such mechanisms may be difficult to implement. This is a weakness of such a mobile telecommunication device.

SUMMARY

It would be advantageous to overcome all or part of the disadvantages of mobile telecommunication devices associated with a near-field transmission module.

It would be advantageous to improve the security against a hacking attempt when the device is only powered by its near-field transmission module.

It would be advantageous to provide a solution compatible with usual subscriber identification modules.

An embodiment provides a telecommunication device comprising:

a battery capable of providing a first power supply voltage to circuits of the device, among which at least one security module;

a near-field communication module capable of providing a second power supply voltage to the security module; and a circuit for activating the provision of the second power supply voltage, comprising a switch controllable at least by one element accessible from the outside of the device.

According to an embodiment, said switch is a mechanical switch.

According to an embodiment, said switch is an electronic switch controlled by at least one signal having its state conditioned at least by that of said control element.

According to an embodiment, the electronic switch can be actuated both when the device is powered by the first voltage and when it is powered by the second voltage.

According to an embodiment, said switch is capable of short-circuiting two conductors for providing said second power supply voltage.

According to an embodiment, said switch is on in the idle state.

According to an embodiment, said switch is in series with a current-to-voltage conversion element, a signal indicative of the state of the switch being sampled from the junction point of these components towards the near-field communication module.

Another embodiment provides a method for controlling a near-field communication module, wherein a response to a request originating from a terminal having the device in its field is only authorized if the switch is off.

BRIEF DESCRIPTION OF THE DRAWINGS

The foregoing and other objects, features, and advantages of the embodiments will be discussed in detail in the following non-limiting description of specific embodiments in connection with the accompanying drawings.

DETAILED DESCRIPTION

Figure 1:
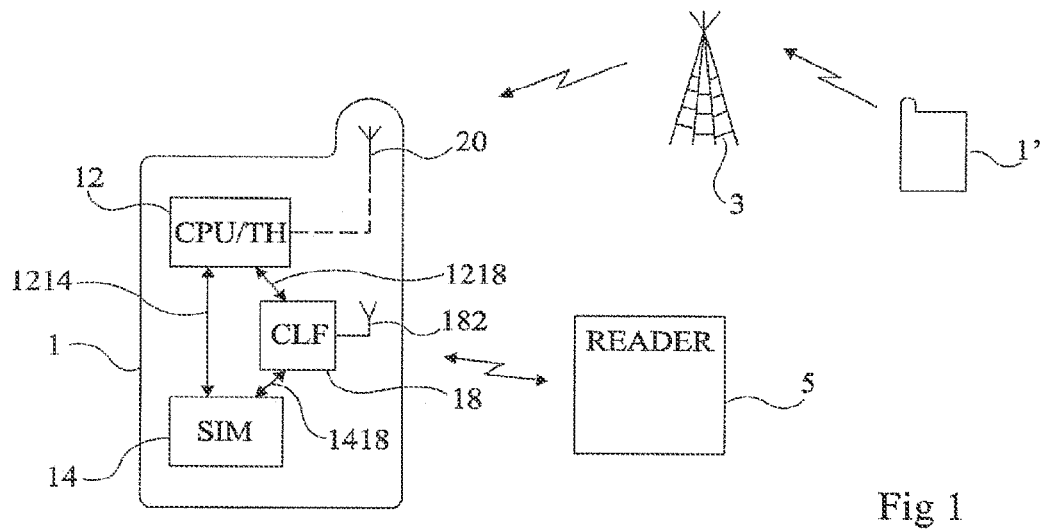
FIG. 1 very schematically shows a mobile telecommunication device of the type to which the embodiments apply as an example and its surrounding system.

The same elements have been designated with the same reference numerals in the different drawings. For clarity, only those elements and steps which are useful to the understanding of the embodiments have been shown and will be described. In particular, the coding and communication protocols, be it for near-field transmissions or for telecommunications in GSM mode, have not been detailed, the described embodiments being compatible with usual protocols. Further, the circuits forming the mobile communication device have not been detailed either, the described embodiments being here again compatible with usual devices.

The embodiments will be described in relation with a cell phone. They however more generally apply to any telecommunication device adapted to a mobile network (for example, Wifi, Bluetooth, WiMax, etc.) and associated with a contactless near-field transmission module.

FIG. 1 very schematically shows a mobile telecommunication device 1 (for example, a cell phone).

Device 1 comprises a central processing unit 12 (CPU/TH) formed of at least one microprocessor forming the device core. This microprocessor is presently called a terminal host. For the telecommunication operation over a network (GSM, 3G, UMTS, etc.), this microprocessor uses identification and authentication data provided by a subscriber identification module 14 (SIM), forming a security module of the device. Microprocessor 12 is capable of using one or several internal memories (not shown) of the telephone. The different elements of interface with the user (keyboard, display, speaker, etc.) have not been shown.

The mobile devices to which the described embodiments apply combine the telecommunication function with that of a near-field contactless transmission system. To achieve this, device 1 comprises a circuit 18 (CLF) forming a near-field communication module, like an electromagnetic transponder. Module 18 is associated with an antenna 182 distinct from an antenna 20 intended for the mobile telephony network. The near-field communication module will be called an "NFC router" since it generally integrates all the functions useful to the emulation of a contactless card within a same circuit, but the described embodiments apply to any NFC-type module.

The different elements of device 1 communicate according to various protocols. For example, circuits 12 and 18 communicate over a link 1218 of I2C, SPI, or other type, and SIM card 14 communicates with microprocessor 12 over a link 1214 according to ISO standard 7816-3. Router 18 communicates with the SIM card, for example, over a single-wire bus 1418 (SWP—Single Wire Protocol). Other versions of protocols and links are, of course, possible.

As illustrated in FIG. 1, device 1 is capable of communicating over a telecommunication network (for example, GSM) symbolized by a relay antenna 3, for example, with another mobile device 1'. In near field, the CLF router is capable of communicating with a reader 5 (READER), for example, an NFC terminal or any other contactless communication terminal.

Figure 2:
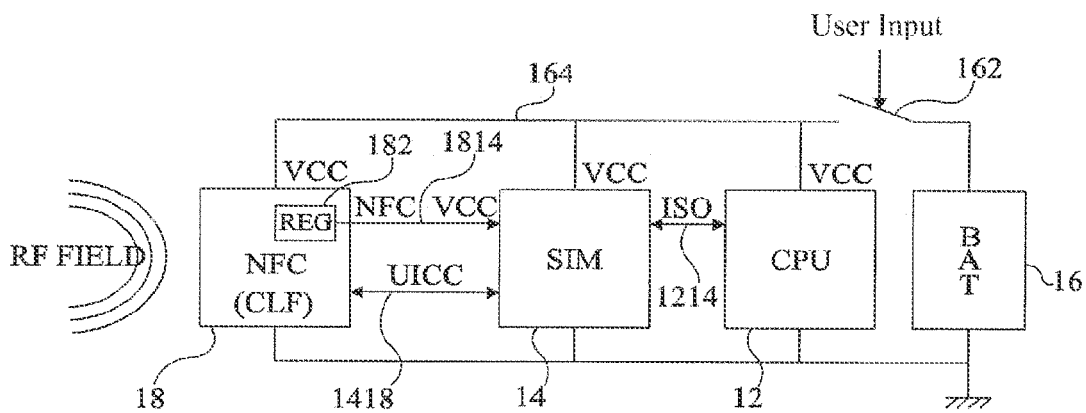
FIG. 2 is a block diagram illustrating the power supply of the circuits internal to the telecommunication device.

FIG. 2 is a block diagram illustrating the power supply of the different circuits of mobile device 1.

The device generally comprises a battery 16 or a power supply capable of providing (generally via a voltage regulator, not shown) a voltage VCC to the different electronic circuits and in particular to NFC router 18, to SIM card 14 (or other security module), to central processing unit 12, as well as to the other circuits (not shown) of the device (keyboard, display, etc.). A switch 162 is functionally interposed between battery 16 and a power supply rail 164 providing voltage VCC. Switch 162, generally electronic, is controlled under the action of a mechanical switch accessible by the user from outside of device 1.

When the mobile device is off (switch 162 open) or when it is in a so-called low-power operating mode (for example, at standby), NFC router 18 remains capable of extracting a power supply voltage from a magnetic field (RF FIELD) radiated by a near-field communication reader (not shown in FIG. 2). Router 18 comprises power regulation means (symbolized by a block 182—REG). Regulator 182 provides a power supply voltage NFC VCC to the different circuits of router 18 as well as, over a link 1814, to SIM card 14. This enables the router to access the security module to obtain authentication or identification elements enabling to validate a transaction with the reader, even when the other device circuits are not powered.

Figure 3:
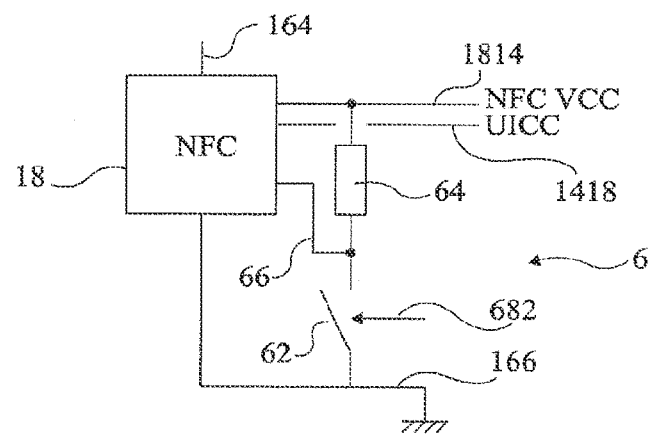
FIG. 3 very schematically shows an embodiment of a circuit for securing a security module.

FIG. 3 schematically shows an embodiment of a circuit 6 for securing the SIM card when the telecommunication device operates in NFC mode. Circuit 6 is a circuit for activating the SIM card power supply.

According to this embodiment, link 1814 between router 18 and security module(s) 14 is connected to ground 166 by a switch 62. The function of this switch is to pull link 1814 to ground as long as a transaction is not authorized.

Preferably, and as illustrated in FIG. 3, a resistor 64 is interposed between switch 62 and link 1814. Resistor 64 forms a current-to-voltage converter and the junction point of the resistor and of switch 62 is connected, by a link 66, to a gate of router 18. The signal present over link 66 indicates, by its state, the state of switch 62, and thus the authorization or not of a near-field operation. Router 18 can use this information to enable/disable some of its internal functions. For example, the router is only authorized to respond to a request from the reader when this signal is active.

In the idle state, switch 62 is on. This means that, by default, the security module is not powered by router 18, even if the latter generates a voltage NFC VCC.

Figure 4:
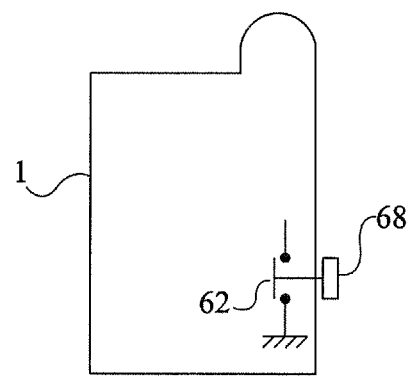
FIG. 4 very schematically shows an embodiment of a mobile telecommunication device equipped with the circuit of FIG. 3.

FIG. 4 schematically shows a device 1 equipped with the system of FIG. 3.

According to this embodiment, switch 62 is mechanical and can be actuated by a push-button 68 accessible from outside of the device. Accordingly, a near-field transaction is only authorized when the user presses push-button 68.

Figure 5:
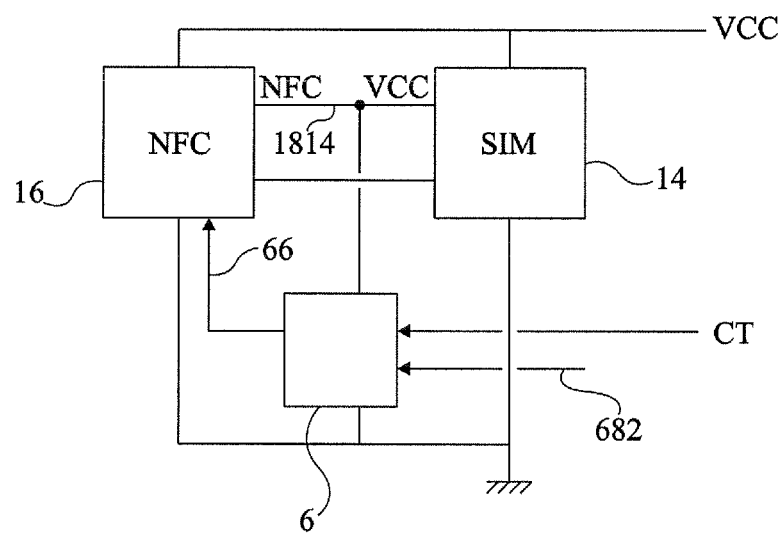
FIG. 5 is a block diagram of a variation of the circuit of FIG. 3.

FIG. 5 shows another embodiment according to which switch 62 is an electronic switch. Circuit 6 receives a signal 682 transmitting the state of push-button 68 and a control signal CT that comes from another external authorization element when the device is powered by its battery. This embodiment enables to take advantage of the protection function (near-field transaction authorization) in all device power supply modes. For example, signal CT is controlled, when the device is active (powered by the battery), by an action of the user on a key of the keyboard or on an area of a touch screen.

Figure 6:
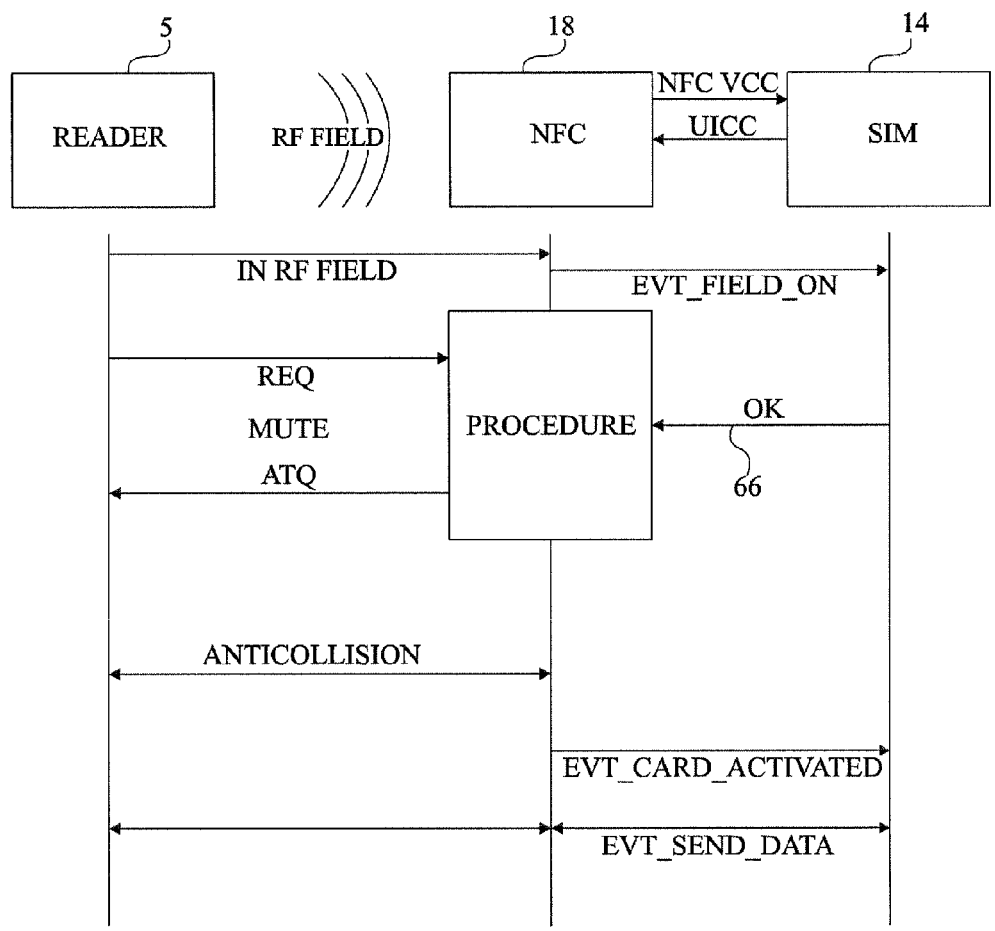
FIG. 6 schematically illustrates an example of exchanges between a reader, a router, and a security module.

FIG. 6 schematically illustrates an example of exchanges between reader 5, router 18, and the SIM card.

When the device enters field RF FIELD of the reader and it is not powered by its battery, the router detects the presence of the magnetic field (IN RF FIELD). It then transmits a control signal (EVT_FIELD_ON) to card 14 to indicate this event. The reader periodically sends requests to the possible routers in its field. When the router receives a request, if the state of signal 66 indicates an authorization (OK), the router responds (ATQ) to the reader. Otherwise, the router remains mute (MUTE) as long as such an authorization has not been received. Then, an anti-collision procedure is implemented between the reader and the router. Then, the router activates the SIM card with a control signal EVT_CARD_ACTIVATED. The card and the reader then communicate (EVT_SEND_DATA) via the router.

In its simplified embodiment (with no link 66), the implementation is particularly simple. It is sufficient to add to the device a switch short-circuiting by default power supply voltage NFC VCC (connecting link 1814 to ground) and to provide an actuator 68 accessible from outside of the mobile device.

It should be noted that the described embodiments require no modification of the SIM card.

Various embodiments have been described, various alterations and modifications will occur to those skilled in the art. For example, switch 62 may be interposed on link 1814 and is then off in the idle state. However, the embodiment illustrated by FIG. 3 eases the extraction of a state signal towards the NFC router.

Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A telecommunication device, comprising:
a battery input to receive a first power supply voltage, said first power supply voltage arranged for provision to circuits of the telecommunication device, among which at least one security module;
a near-field communication module capable of providing a second power supply voltage to the security module; and
a circuit to activate provision of the second power supply voltage, the circuit including a switch controllable at least by one element accessible from the outside of the telecommunication device and a current-to-voltage conversion element in series with the switch, a signal indicative of a state of the switch sampled by the near-field communication module from a junction point of the switch and the current-to-voltage conversion element.

2. The device of claim 1, wherein said switch is a mechanical switch.

3. The device of claim 1, wherein said switch is an electronic switch controlled by at least one signal having a state said electronic switch conditioned at least by that of a control element.

4. The device of claim 3, wherein the electronic switch can be actuated both when the device is powered by the first voltage and when the device is powered by the second voltage.

5. The device of claim 1, wherein said switch is capable of short-circuiting two conductors for providing said second power supply voltage.

6. The device of claim 5, wherein said switch is on in an idle state.

7. A method to control a near-field communication module, of a portable device, the portable device including a series configuration of a switch and a current-to-voltage conversion element, the series configuration arranged between two voltage potential nodes of the near-field communication module, comprising:
powering the portable device with a first power supply voltage derived from a battery;
positioning the portable device in an electromagnetic field of a terminal;
generating a second power supply voltage from an electromagnetic signal of the terminal;
sensing at the near-field communication module a signal between the switch and the current-to-voltage conversion element, the signal indicative of a state of the switch, the state of the switch representative of a user input;
based on the user input, permitting or denying access by the near-field communication module to information in a security module of the portable electronic device.

8. The method of claim 7, comprising:
removing the first power supply voltage.

9. The method of claim 7, comprising:
further conditioning access by the near-field communication module to information in the security module of the portable electronic device on a control signal from an external authorization element.

10. The method of claim 9, wherein said control signal is derived from a touch screen input to the portable electronic device.

11. A portable device, comprising:
a security module;
a battery input, the battery input configured to pass first power to circuits of the portable device including the security module;
a near-field communication module, the near-field communication module configured to generate second power from a sensed electromagnetic field, the near-field communication module configured to pass the second power to the security module; and
a series configuration including a switch and a current-to-voltage conversion element, a node in the series configuration coupled to the near-field communication module, the node arranged to pass a signal representative of a state of the switch, wherein the near-field communication module is permitted to access information in the security module when the switch has taken a first state and wherein the near-field communication module is not permitted to access information in the security module when the switch has taken a second state.

12. The portable device of claim 11, wherein said current-to-voltage conversion element is a resistor.

13. The portable device of claim 11, wherein said portable device is a mobile telephone.

14. The portable device of claim 11, wherein said switch is a mechanical switch.

15. The portable device of claim 11, wherein said switch is an electronic switch, said electronic switch controllable via a user input to the portable device.

16. The portable device of claim 11, wherein at least two operations are required in order to activate said switch.

* * * * *